Oct. 21, 1947.    R. T. BURROWS    2,429,547
LAWN MOWER SHARPENER
Filed Nov. 8, 1946
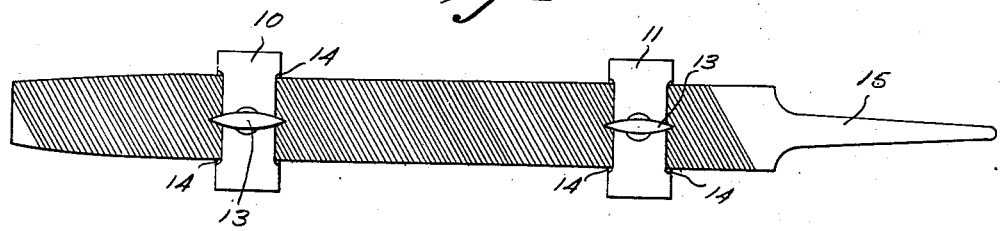
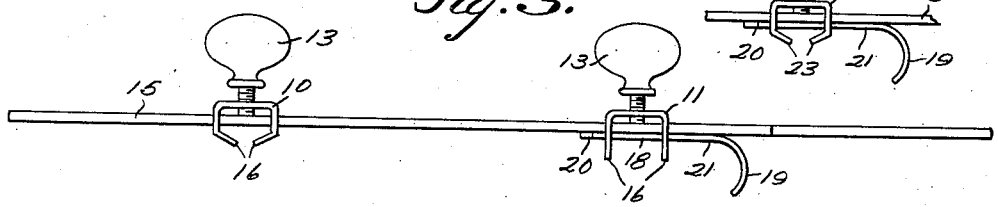
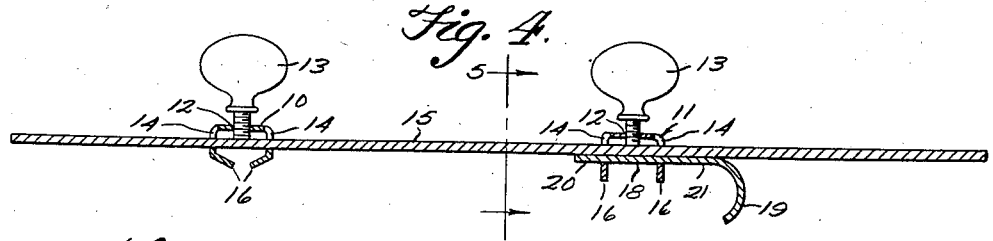
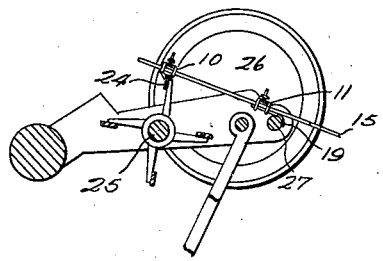
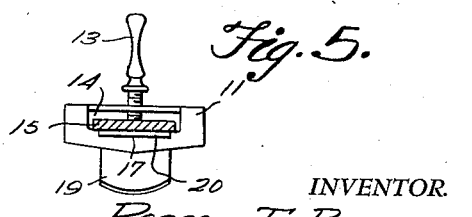
INVENTOR.
Roscoe T. Burrows,
BY *Victor J. Evans & Co.*
ATTORNEYS Patented Oct. 21, 1947

2,429,547

UNITED STATES PATENT OFFICE 2,429,547

LAWN MOWER SHARPENER

Roscoe T. Burrows, Mystic, Conn.

Application November 8, 1946, Serial No. 708,499

1 Claim. (Cl. 76—82.1)

This invention relates to a lawn mower sharpener, and the primary object of the invention is the provision of a tool of this character which is designed to be used in conjunction with a steel file or the like, so that the file can be applied to the cutting edges of the blades of a lawn mower cutting reel so that the cutting edges can be speedily and efficiently sharpened without excessive labor on the part of the user of the tool which is adapted to be manually operated to uniformly and truly sharpen the cutting edges during its operation.

Another object of the invention is the provision of a tool of this character, wherein the steel file can be removably placed therein, and reversed or adjusted for presenting an unused or shapened surface to the cutting edge of the blades, when the side being used becomes dull or unusable.

A further object of the invention is the provision of a tool of this character that is simple in construction, thoroughly reliable and efficient in operation, strong and durable in use, and can be readily and easily applied and removed to and from working position, is possessed of few working parts, and requires but little exertion on the part of the user thereof in the operation thereof, and is also inexpensive to manufacture.

With the above and other objects and advantages in view, the invention consists of the novel features of construction, arrangement and combination of parts more fully hereinafter described and illustrated in the accompanying drawings in which:

Figure 1 is a plan view of a tool forming an embodiment of the invention;

Figure 2 is a similar view of the opposite side as that shown in Figure 1;

Figure 3 is an edge view thereof;

Figure 4 is a longitudinal sectional view thereof;

Figure 5 is a transverse sectional view thereof;

Figure 6 is a fragmentary vertical sectional view through a lawn mower, showing the tool applied thereto for the sharpening of the cutting edge of the blades of the cutting reel and Figure 7 is a fragmentary detailed view of a modified form of the invention.

Referring more in detail to the drawing, the tool forming an embodiment of the invention comprises two channel shaped members 10 and 11 which are provided with centrally located threaded bores 12 to receive the wing bolts 13 therein. Each member is provided in the side flanges thereof with elongated slots 14 for the reception of a steel file 15 therein, and tightening of the bolts 13 adjustably retains the members on the file.

The bottom edges of the side flanges are tapered toward a central point 16, and the tapered portion of the side flanges on the member 10 which forms a blade guide are bent inwardly toward each other, as shown in Figure 2, and the space between the inturned portions is of the width of the blade of a lawn mower cutting reel.

The member 11 which forms a guide clamp does not have the side flanges bent inwardly as shown in Figures 1 to 6 inclusive, but the side flanges have a reduced slot 17 at the bottom edge of the slot 14 communicating therewith, which is adapted to receive the reduced portion 18 of the hanger hook 19, and the enlarged end portion 20 and the enlarged end portion 21 form shoulders 22 that abut the side flanges of the member 11 to retain the hanger hook 19 in position in the slot 17.

To permit interchangeability of the members 10 and 11, the member 11 shown in Figure 7 has the tapered portion 23 thereof tuned inwardly as is the tapered portion of the member 10. Otherwise, the construction is as previously described.

In use, the cutting blade 24 of the cutting reel 25 of the lawn mower 26 is positioned intermediate the tapered portion of the side flanges of the member 10, and with the blade thus positioned, the reel will be caused to rotate when the member 10 is moved laterally across the cutting edge of the blade carrying the blade retained therein by the bolt 13 across the cutting edge for the sharpening thereof. During this operation, the mower 26 is placed in an inverted position, as shown in Figure 6, and the tool is manually operated for the sharpening of the cutting edge of the blade. The hanger hook 19 is engaged over the cross rod 27 of the lawn mower to hold the file in a fixed applied position on the cutting edge of the blade, and to guide the tool during the oscillating sharpening motion thereof. With the reel rotating as described, the file follows the spiral formation of the cutting edge of the blade being sharpened.

The members 10 and 11 can be adjusted relative to each other according to the disposition of the blades of the cutting reel with respect to the cross rod 27 of the mower 26 for the correct setting of the tool and the members can be removed from the file, should it be desired to file the cutting edge without the use of these members.

It is believed that from the foregoing description, the operation and construction of the tool will be apparent to those skilled in the art, and it is to be understood that changes in the minor details of construction, arrangement and combination of parts may be resorted to, providing they fall within the spirit of the invention, and the scope of the appended claim.

Having thus described the invention, what is claimed as new and desired to be secured by Letters Patent is:

In a sharpener for cutting blades of lawn mowers and the like, the combination, which comprises, a file, a blade clamp comprising a channel shaped member with a back and downwardly extending side flanges and having file receiving slots in the side flanges, the lower edges of said side flanges carrying oppositely positioned substantially V-shaped downwardly sloping flanges with the vertexes thereof on a line corresponding with the longitudinal center of the file with the file extending through the slots of the clamp, a guide clamp also comprising a channel shaped member with a back and downwardly extending side flanges and file receiving slots in said side flanges, a guide clip comprising a bar with a downwardly extending arcuate end having a reduced intermediate portion by which the clip is located in notches in the lower edges of the file receiving slots of the guide clamp, and centrally disposed thumb screws in the backs of the blade and guide clamps for adjustably securing the said clamps in operative positions on the file.

ROSCOE T. BURROWS.

REFERENCES CITED

The following references are of record in the file of this patent:

UNITED STATES PATENTS

| Number | Name | Date |
|---|---|---|
| 1,817,331 | Wilson | Aug. 4, 1931 |
| 1,829,289 | McMurtry | Oct. 27, 1931 |
| 2,293,837 | Law | Aug. 25, 1942 |
| 2,410,566 | Burrows | Nov. 5, 1946 |